(12) United States Patent
Shiozawa (10) Patent No.: US 9,967,826 B2
(45) Date of Patent: May 8, 2018

(54) RECEIVING CIRCUIT, RECEIVING DEVICE INCLUDING THE SAME, AND RECEIVING METHOD

(71) Applicant: JVC KENWOOD Corporation, Yokohama-shi, Kanagawa (JP)

(72) Inventor: Hideaki Shiozawa, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days. days.

(21) Appl. No.: 15/345,668

(22) Filed: Nov. 8, 2016

(65) Prior Publication Data

US 2017/0135037 A1    May 11, 2017

(30) Foreign Application Priority Data

Nov. 10, 2015    (JP) ................. 2015-220101

(51) Int. Cl.
*H03K 9/00* (2006.01)
*H04W 52/02* (2009.01)
*H04B 1/00* (2006.01)
*H04B 1/16* (2006.01)

(52) U.S. Cl.
CPC ........ *H04W 52/029* (2013.01); *H04B 1/0014* (2013.01); *H04B 1/0017* (2013.01); *H04B 1/16* (2013.01)

(58) Field of Classification Search
CPC . H04W 52/029; H04B 1/0014; H04B 1/0017; H04B 1/16

USPC .......................................... 375/316
See application file for complete search history.

(56) References Cited

U.S. PATENT DOCUMENTS

| 2009/0125429 A1* | 5/2009 | Takayama | G06Q 20/04 705/35 |
| 2012/0027133 A1* | 2/2012 | Raman | G01S 19/246 375/340 |
| 2015/0139218 A1* | 5/2015 | Cumeralto | H04L 1/20 370/350 |

FOREIGN PATENT DOCUMENTS

JP    2012-034287    2/2012

* cited by examiner

*Primary Examiner* — Helene Tayong
(74) *Attorney, Agent, or Firm* — Amin, Turocy & Watson LLP (57) ABSTRACT

A receiving circuit includes a receiver configured to receive a signal, a detector configured to detect arrival of a reception signal based on a signal received by the receiver, a buffer configured to store therein data corresponding to the reception signal, a demodulation processor configured to demodulate data to be supplied, and a controller configured to store the data corresponding to the reception signal in the buffer when the detector does not detect the arrival of the reception signal, and to supply the data stored in the buffer to the demodulation processor when the detector detects the arrival of the reception signal.

7 Claims, 8 Drawing Sheets

| FSW | RICH | SACCH | TCH1 | TCH2 |
|---|---|---|---|---|
| 20 bits | 16 bits | 60 bits | 144 bits | 144 bits |

RECEIVING CIRCUIT, RECEIVING DEVICE INCLUDING THE SAME, AND RECEIVING METHOD

CROSS-REFERENCE TO RELATED APPLICATION

The present application claims priority to and incorporates by reference the entire contents of Japanese Patent Application No. 2015-220101 filed in Japan on Nov. 10, 2015.

FIELD

The present application relates to a receiving circuit, a receiving device including the same, and a receiving method.

BACKGROUND

A reception waiting time of a transportable wireless device is preferably extended as long as possible, by reducing power consumption and extending battery life. In a wireless communication, while signals are not being received and a wireless communication device is waiting for arrival of a signal (during a reception waiting time), functions of a receiver in the wireless communication device may be limited to a minimum, by only using the receiver for determining a received level of a reception signal and the like. For example, a circuit, a digital signal processor (DSP), or the like that performs a receiving process is operated in a power saving mode. More specifically, when a field intensity of a reception signal, in other words, a received level is less than a threshold, power consumption of the device may be reduced by lowering a speed of an operation clock of a processor in the device than that when the received level is high.

Japanese Laid-open Patent Publication No. 2012-34287 discloses a technology in which demodulation is started when a detected received level is equal to or more than a predetermined threshold. In Japanese Laid-open Patent Publication No. 2012-34287, a received level detector intermittently performs a signal level determining process at a reception cycle, to reduce power consumption of a wireless communication device. When the signal level is equal to or more than a predetermined threshold, a receiving circuit starts the demodulation.

In a digital wireless system, data is transmitted and received in a signal format and frame structure that are defined in advance in a specification of the systems. When data is transmitted and received in the signal format and the frame structure, a synchronization frame is basically inserted in each frame period. Consequently, the receiving device extracts a synchronization word from the received signal and specifies the frame.

When the receiving device intermittently determines arrival of a reception signal in a fixed cycle for a power saving operation and the like to thereby detect the arrival of the reception signal, the arrival of a signal is first detected by intermittently determining the arrival of the reception signal, and then the reception signal is demodulated. During this process, when a timing at which the arrival of the reception signal is determined is deviated from a timing at which the reception signal starts arriving, a synchronization frame just after the reception signal starts arriving cannot be detected. Thus the frame cannot be confirmed, thereby omission of a head part of the reception signal occurs and demodulation of the reception signal cannot be performed. In particular, in a receiving device used in an emergency such as in a police wireless system or a fire wireless system, the omission of the head part of the reception signal is not preferable.

SUMMARY

It is an object of the present disclosure to at least partially solve the problems in the conventional technology.

According to one aspect, there is provided a receiving circuit, comprising: a receiver configured to receive a signal; a detector configured to detect arrival of a reception signal based on a signal received by the receiver; a buffer configured to store therein data corresponding to the reception signal; a demodulation processor configured to demodulate data to be supplied; and a controller configured to store the data corresponding to the reception signal in the buffer when the detector does not detect the arrival of the reception signal; and to supply the data stored in the buffer to the demodulation processor when the detector detects the arrival of the reception signal.

According to one aspect, there is provided a receiving device, comprising: a receiving circuit comprising a receiver configured to receive a signal, a detector configured to detect arrival of a reception signal based on a signal received by the receiver, a buffer configured to store therein data corresponding to the reception signal, a demodulation processor configured to demodulate data to be supplied, and a controller configured to store the data corresponding to the reception signal in the buffer when the detector does not detect the arrival of the reception signal and to supply the data stored in the buffer to the demodulation processor when the detector detects the arrival of the reception signal; and an output unit configured to output data that is demodulated by the demodulation processor.

According to one aspect, there is provided a receiving method, comprising: detecting arrival of a reception signal; storing data corresponding to the reception signal when the arrival of the reception signal is not detected; and demodulating the stored data in ascending order of the stored time sequentially when the arrival of the reception signal is detected.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, an embodiment of a receiving circuit, a receiving device including the same, and a receiving method according to the present disclosure will be described in detail with reference to the accompanying drawings. It is to be understood that the present disclosure is not limited to the embodiment.

Receiving Device

Figure 1:
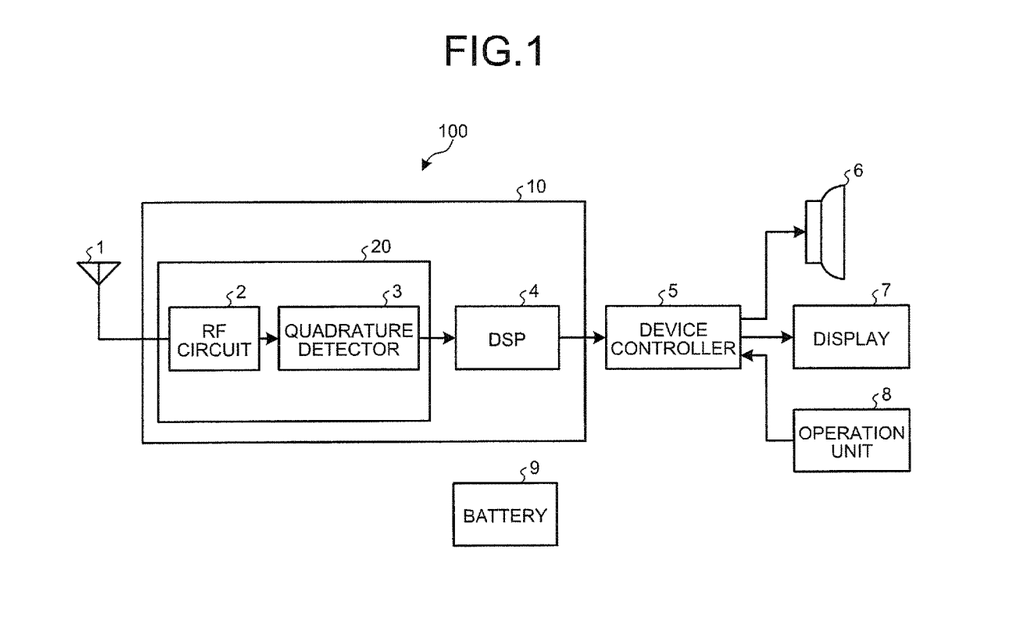
FIG. 1 is a diagram illustrating an embodiment of a receiving device including a receiving circuit according to the present disclosure.

FIG. 1 is a diagram illustrating an embodiment of a receiving device 100 including a receiving circuit 10 according to the present disclosure. As illustrated in FIG. 1, the receiving circuit 10 includes an antenna 1, a receiver 20, a DSP 4, a device controller 5, a speaker 6, a display 7, an operation unit 8, and a battery 9.

The antenna 1 receives a signal transmitted from a transmission side. The signal received by the antenna 1 is transmitted to the receiver 20. The receiver 20 includes a radio frequency (RF) circuit 2 and a quadrature detector 3. The RF circuit 2 performs a process of converting a frequency of the signal that is received by the antenna 1 and the like. The signal processed by the RF circuit 2 is transmitted to the quadrature detector 3. The quadrature detector 3 performs quadrature detection on the signal that is output from the RF circuit 2.

The DSP 4 performs a digital signal process on a detection signal that is output from the quadrature detector 3. The configuration and functions of the DSP 4 will be described below.

The device controller 5 controls the units in the receiving device 100. The DSP 4 supplies a signal to the device controller 5, and the device controller 5 outputs the supplied signal to the speaker 6 and the display 7. The speaker 6 and the display 7 each have a function of an output unit for outputting data that is demodulated by the DSP 4. The device controller 5 executes an operation based on a signal that is supplied from the operation unit 8. For example, the device controller 5 adjusts sound that is output from the speaker 6, based on the signal that is supplied from the operation unit 8. The device controller 5 also changes display content of the display 7, based on a signal that is supplied from the operation unit 8.

The speaker 6 outputs sound based on a sound signal that is output from the device controller 5. When the receiving device 100 also functions as a transmission device, the speaker 6 also functions as a microphone.

The display 7 displays various types of information relating to the receiving device 100 that are output from the device controller 5. For example, the display 7 includes a liquid crystal panel.

The operation unit 8 is a portion that is operated by a user of the receiving device 100. The operation unit 8 includes buttons and dials. For example, the user operates the operation unit 8, when the user turns ON the power supply of the receiving device 100 or performs various settings. The operation unit 8 transmits a signal that is obtained by the user's operation on the device controller 5.

The battery 9 supplies power to the various units in the receiving device 100. The receiving device 100 can be implemented as a transportable device, by operating the receiving device 100 using the power supplied from the battery 9.

In the receiving device 100 of the present embodiment, the antenna 1 receives signal transmitted from the transmission device and the like. The signal that is received by the antenna 1 is supplied to the receiver 20. The RF circuit 2 of the receiver 20 performs a process of converting frequency of the signal received by the antenna 1 and the like. For example, the RF circuit 2 converts the signal received by the antenna 1 to a signal with a lower frequency. The quadrature detector 3 of the receiver 20 performs quadrature detection on the signal that is output from the RF circuit 2. The quadrature detector 3 outputs a detection signal composed of an In-phase (I) signal and a quadrature-phase (Q) signal the phases of which are orthogonal to each other, by the quadrature detection. The DSP 4 performs a digital signal processing on the detection signal that is output from the quadrature detector 3. The DSP 4 outputs a digital signal. The output signal from the DSP 4 is supplied to the device controller 5. Based on the signal being supplied, the device controller 5 controls the speaker 6 to output a sound signal, controls the display 7 to display various types of information relating to the receiving device 100. The device controller 5 controls the units in the receiving device 100 based on the operation of the operation unit 8 by the user.

Example of a Format of a Signal

Figure 2:
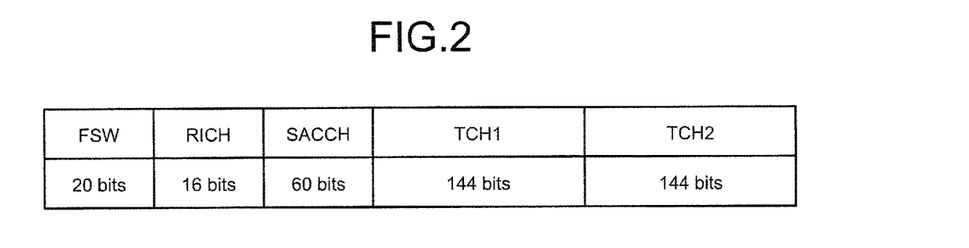
FIG. 2 is a diagram illustrating an example of a format of a 4-level FSK signal.

The Association of Radio Industries and Businesses (ARIB) STD-T98 provides one of the digital radio systems, and a 4-level frequency shift keying (FSK) is specified as a digital modulation system. FIG. 2 is a diagram illustrating an example of a format of a 4-level FSK signal.

As illustrated in FIG. 2, the formats of the 4-level FSK signal include a frame synchronization word (FSW), a radio information channel (RICH), a slow associated control channel (SACCH), and two traffic channels (TCHs) of a TCH 1 and a TCH 2.

In the present example, the FSW is 20 bits, the RICH is 16 bits, the SACCH is 60 bits, and the TCH 1 and TCH 2 are both 144 bits.

Configuration of the DSP

The DSP 4 will now be described with reference to FIG. 3 to FIG. 6. The DSP 4 in the present embodiment performs a digital process on detection signal to which quadrature detection has been performed by the quadrature detector 3. The DSP 4 receives the detection signal that is output from the quadrature detector 3, as quadrature detection data of digital data having been converted by a predetermined sampling frequency. The DSP 4 processes the reception data every time the DSP 4 receives N pieces (N is a positive integer) of the quadrature detection data.

Figure 3:
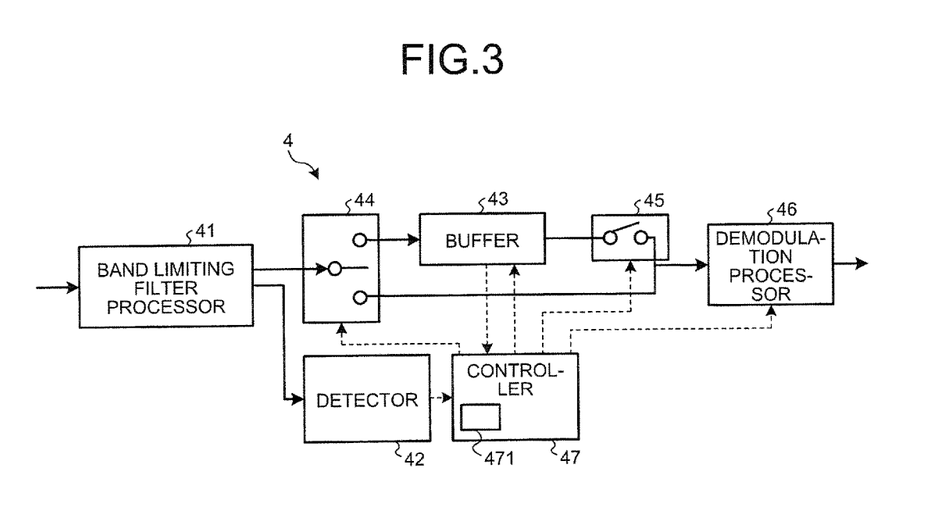
FIG. 3 is a diagram illustrating a configuration example of a DSP used in the receiving circuit.

FIG. 3 is a diagram illustrating a configuration example of the DSP 4 used in the receiving circuit 10. The DSP 4 illustrated in FIG. 3 includes a band limiting filter processor 41, a detector 42, a buffer 43, switchers 44 and 45, a demodulation processor 46, and a controller 47. Broken lines in FIG. 3 indicate signal lines of the controller 47 for controlling the units.

The band limiting filter processor 41 performs a process of limiting a bandwidth in which the digital processing is to be performed.

The detector 42 detects a received level of a reception signal, and detects arrival of the reception signal. The detector 42 always detects the received level of the reception signal. Thus, it is possible to detect the arrival of the signal that is output from the transmission side, the arrival of which is uncertain. When the received level of the detected reception signal is less than a predetermined threshold, the detector 42 determines that the reception signal has not arrived. When the received level of the detected reception signal is equal to or more than the predetermined threshold, the detector 42 determines that the reception signal has arrived. For example, the detector 42 calculates the intensity of the received level of the reception signal based on amplitude of the signal that has been processed by the band limiting filter processor 41. For example, the detector 42 may calculate an average value of the signal amplitude, by integrating the signal that has been processed by the band limiting filter processor 41.

The buffer 43 stores therein data that has been processed by the band limiting filter processor 41, for a predetermined duration of time. In other words, the buffer 43 stores therein a predetermined number of pieces of data corresponding to the reception signal that is supplied to the receiving device 100. The predetermined number will be described in detail in an example of a structure of the buffer, which will be described below. The buffer 43 is a temporary storage device which is capable of writing data, deleting data and reading data, being controlled by the controller 47.

The switcher 44 is connected to the band limiting filter processor 41, the buffer 43, and the demodulation processor 46. The switcher 44 switches between a state of connecting the band limiting filter processor 41 with the buffer 43, and a state of connecting the band limiting filter processor 41 with the demodulation processor 46. Consequently, the switcher 44 switches between a state of supplying the signal that is processed by the band limiting filter processor 41 to the buffer 43 and a state of supplying the signal that is processed by the band limiting filter processor 41 to the demodulation processor 46.

The switcher 45 is connected to the buffer 43 and the demodulation processor 46. The switcher 45 switches between a state of connecting the buffer 43 with the demodulation processor 46 (ON), and a state of separating the buffer 43 from the demodulation processor 46 (OFF). The switcher 45 switches between a state of supplying the signal that is output from the buffer 43 to the demodulation processor 46 and a state of not supplying the signal that is output from the buffer 43 to the demodulation processor 46.

The demodulation processor 46 is connected to the buffer 43 via the switcher 45, and is connected to the band limiting filter processor 41 via the switcher 44. The demodulation processor 46 performs a demodulation process on the supplied data.

The controller 47 controls the units in the DSP 4. The controller 47 switches the switcher 44 and the switcher 45, based on whether the detector 42 has detected the arrival of the reception signal. More specifically, the controller 47 switches the switcher 44 and the switcher 45, based on the received level of the reception signal detected by the detector 42. In addition, the controller 47 supplies the number of pieces of data to be demodulated to the demodulation processor 46. The controller 47 includes an area 471 that stores therein the number of pieces of data having been stored in the buffer 43.

Operation of the DSP

As described above, when the omission of the head part of the reception signal with a FSW as a frame synchronization word being disposed at a beginning of a frame signal of the reception signal occurs during the reception, there is a possibility that the first synchronization word cannot be received, and information may be lost on a frame-by-frame basis. Thus, in the receiving circuit 10 of the present embodiment, data corresponding to the reception signal is stored in the buffer 43 of the DSP 4 during a state when the received level of the reception signal does not reach the predetermined threshold (hereinafter, referred to as "buffering" in some cases). Consequently, when the received level of the reception signal reaches the predetermined threshold, a demodulation process is performed using the buffered data. The operation of the DSP will be described in greater detail below.

Figure 4:
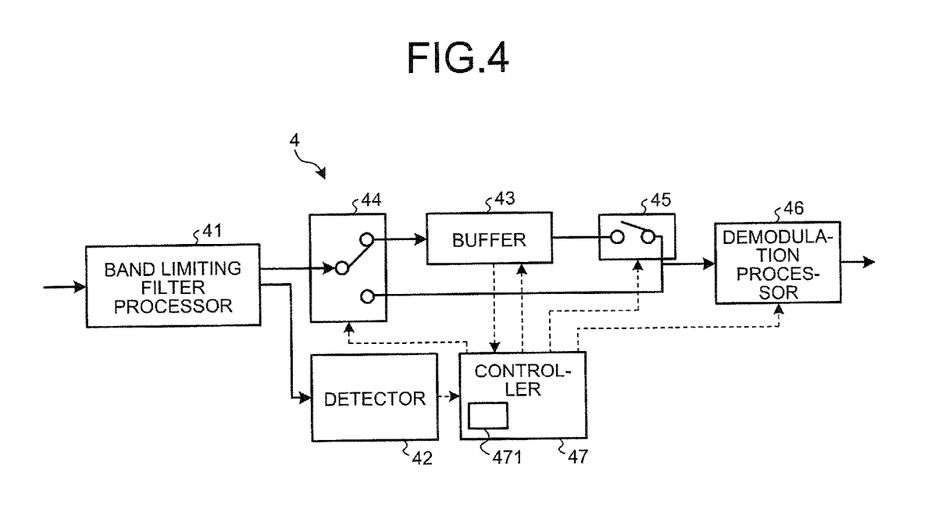
FIG. 4 is a diagram illustrating a state of the DSP in a reception waiting state.
Figure 5:
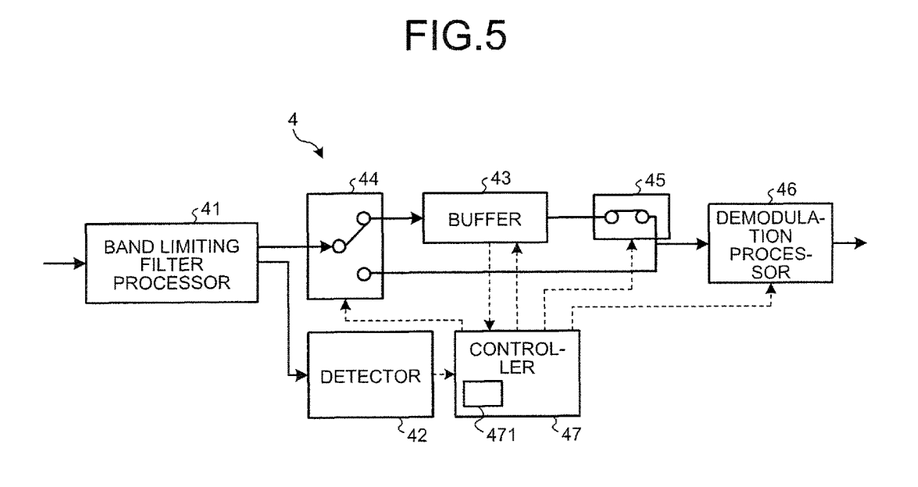
FIG. 5 is a diagram illustrating a state of the DSP while the DSP is receiving a reception signal and data is stored in a buffer.
Figure 6:
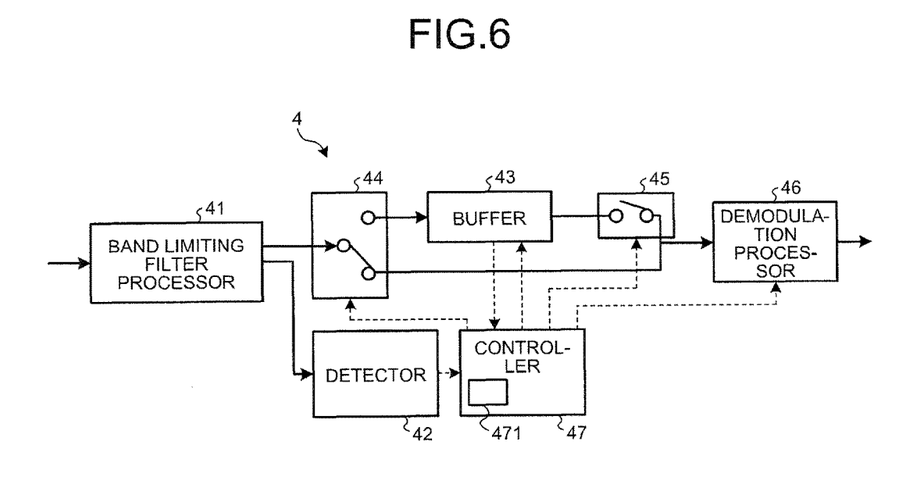
FIG. 6 is a diagram illustrating a state of the DSP while the DSP is receiving a reception signal and data is not stored in the buffer.

FIG. 4 to FIG. 6 are diagrams each illustrating a control operation of the DSP 4, in other words, an example of switching the switcher 44 and the switcher 45 by the controller 47. FIG. 4 is a diagram illustrating a state of the DSP 4 not receiving a reception signal, in other words, a state of the DSP 4 in a reception waiting state. FIG. 5 is a diagram illustrating a state of the DSP 4 receiving a signal and storing data in the buffer 43. FIG. 6 is a diagram illustrating a state of the DSP 4 receiving a signal and not storing data in the buffer 43.

When the received level of the reception signal detected by the detector 42 is lower than the predetermined threshold, the controller 47 determines that the reception signal has not arrived. Thus, the DSP 4 is in the reception waiting state. During the reception waiting state, as illustrated in FIG. 4, the controller 47 controls the switcher 44 so that data corresponding to the reception signal is to be supplied to the buffer 43 (hereinafter, referred to as a "first state"). During the reception waiting state, as illustrated in FIG. 4, the controller 47 turns OFF the switcher 45. By controlling the switchers 44 and 45 in this manner, the DSP 4 is in the reception waiting state, and in addition to performing the threshold determining process of the received level of the reception signal, data corresponding to the reception signal to be used for demodulation is stored in the buffer 43 for a certain period of time. More particularly, in the buffer 43, the oldest data (data being stored earlier) among the stored data is overwritten and deleted every time data corresponding to the new reception signal is supplied. When the received level of the reception signal detected by the detector 42 is lower than the predetermined threshold, the controller 47 sets the demodulation processor 46 in a power-saving mode in which the power consumption is low, and saves the power consumption.

When the received level of the reception signal detected by the detector 42 is equal to or more than the predetermined received level, the controller 47 determines that the reception signal has arrived. Thus, the DSP 4 starts receiving the signal. As illustrated in FIG. 5, when the DSP 4 starts receiving the signal, the controller 47 turns ON the switcher 45, while keeping the switcher 44 in the first state. In other words, when the detector 42 has detected the arrival of the reception signal and data has been stored in the buffer 43, the controller 47 sets the switcher 44 in the first state.

Then, the controller 47 turns the demodulation processor 46 to an operation mode from the power saving mode. The controller 47 sequentially reads out the data stored in the buffer 43 from the oldest data (data being stored earlier), and supplies the read data to the demodulation processor 46. The demodulation processor 46 demodulates the data that is read out from the buffer 43. By buffering the data in the buffer 43, the demodulation process can be started from the data corresponding to the reception signal just before the received level of the reception signal changes. Thus, it is possible to prevent the omission of the head part of the reception signal. For example, even if the detector 42 performs an integration process to detect the amplitude of data, it is possible to prevent the omission of the head part of the reception signal by storing data in the buffer 43 and by reading the stored data to perform the demodulation process.

In this example, a time difference occurs between a time at which new data corresponding to the reception signal is supplied to the buffer 43 and a time at which the oldest data to be demodulated was stored in the buffer 43 by the data length stored in the buffer 43. In other words, data delay occurs by the buffering process which stores data in the buffer 43. Thus, the controller 47 temporary increases the number of pieces of data to be demodulated, to the extent that processing load thereof is not affected, just after the demodulation processor 46 starts the demodulation process. This is referred to as a high-speed demodulation mode. Thus, the buffer 43 can reduce the number of the stored data, to thereby eliminate the delay.

In the present embodiment, in the high-speed demodulation mode, the number of pieces of data to be demodulated is increased by twice, in other words, 2*N pieces. The number of pieces of data to be demodulated is not only increased by twice but may also be increased by other integer multiples. However, if the number of pieces of data to be demodulated is increased too much, the power consumption may be affected. Consequently, it is preferable to increase the number of pieces of data to the extent that the power consumption does not increase.

When data is not stored in the buffer 43 anymore, as illustrated in FIG. 6, the controller 47 controls the switcher 44 so that data corresponding to the reception signal will not be supplied to the buffer 43. In other words, when the detector 42 has detected the arrival of the reception signal and data is not stored in the buffer 43 while the switcher 44 is set in the first state, the controller 47 controls the switcher 44 so that data corresponding to the reception signal is to be supplied to the demodulation processor 46 without passing through the buffer 43 (hereinafter, referred to as a "second state"). In other words, the controller 47 switches the switcher 44 from the first state to the second state. When the switcher 44 is switched to the second state, the demodulation processor 46 demodulates a supplied signal to which the buffering process by the buffer 43 is not performed. When the switcher 44 is switched to the second state, the controller 47 changes the processing mode of the demodulation processor 46 from the state when the number of pieces of data to be demodulated is increased by twice to a normal processing mode, in other words, to a normal demodulation mode.

Receiving Method

Figure 7:
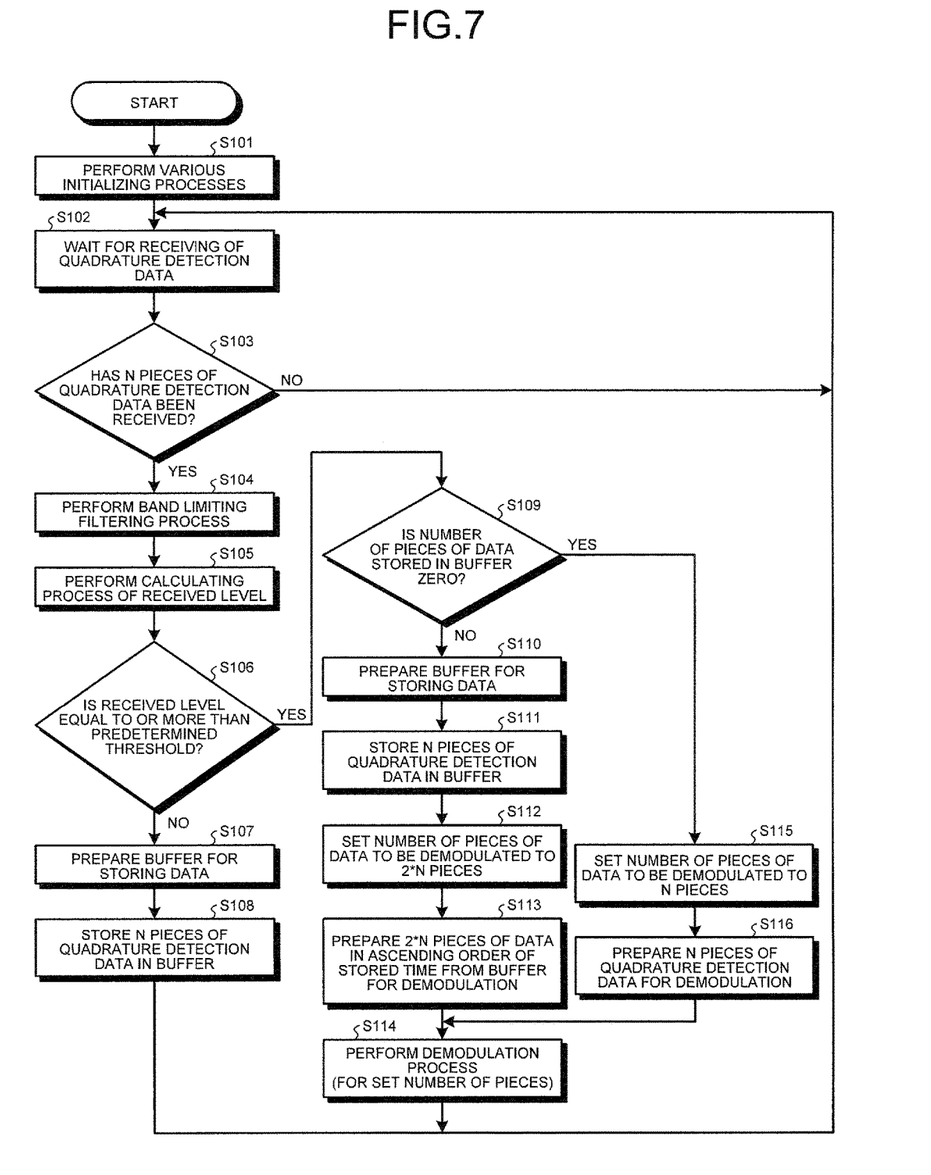
FIG. 7 is a flowchart illustrating a receiving method implemented by the receiving circuit.

FIG. 7 is a flowchart illustrating a receiving method implemented by the receiving circuit 10. FIG. 7 mainly illustrates a processing procedure of the DSP 4.

At step S101, the DSP 4 performs various initializing processes before starting the operation. At step S102, the DSP 4 waits until the DSP 4 has received N pieces of quadrature detection data. At step S103, the DSP 4 determines whether the DSP 4 has received the N pieces of quadrature detection data. As a result of the determination at step S103, when it is determined that the DSP 4 has received the N pieces of quadrature detection data (Yes at step S103), the process proceeds to step S104. At step S104, after receiving the N pieces of the quadrature detection data, the DSP 4 performs a band limiting filtering process on the N pieces of the data. After performing the filtering process, at step S105, the DSP 4 performs a process of calculating the received level of the data to which the band limiting filtering process has been performed. After calculating the received level, at step S106, the DSP 4 determines whether the calculated received level is equal to or more than a predetermined threshold (less than the predetermined threshold). As a result of the determination at step S106, when the received level is less than the predetermined threshold, the DSP 4 proceeds to step S107. At step S107, the DSP 4 prepares the buffer 43 for storing data. For example, the DSP 4 specifies the address of the buffer 43. At step S108, the DSP 4 stores the N pieces of the quadrature detection data in the buffer 43. The DSP 4 then returns to step S102.

As a result of the determination at step S106, when the received level is equal to or more than the predetermined threshold (Yes at step S106), the DSP 4 proceeds to step S109. At step S109, the DSP 4 determines whether the number of pieces of data stored in the buffer 43 is zero. As a result of the determination at step S109, when the number of pieces of data stored in the buffer 43 is not zero (No at step S109) (when data is stored in the buffer 43, and delay is not eliminated), the DSP 4 proceeds to step S110. At step S110, the DSP 4 prepares the buffer 43 for storing data. For example, the DSP 4 specifies the address of the buffer 43 for storing the N pieces of data. When the address is specified, at step S111, the DSP 4 stores the N pieces of the quadrature detection data in the buffer 43. When the data is stored in the buffer 43, at step S112, the DSP 4 sets the number of pieces of data to be demodulated to 2*N pieces. For example, the DSP 4 instructs the demodulation processor 46 to demodulate the 2*N pieces of data. When the number of pieces of data to be demodulated is set, at step S113, the DSP 4 prepares the 2*N pieces of the data in ascending order of the stored time from the buffer 43. For example, the DSP 4 specifies the address of the buffer 43 for reading out the 2*N pieces of the data. When the address is specified, at step S114, the DSP 4 performs a demodulation process on the set pieces of the data by the demodulation processor 46. Then, the DSP 4 returns to step S102.

As a result of the determination at step S109, when the number of pieces of data stored in the buffer 43 is zero (Yes at step S109) (data is not stored in the buffer 43, and delay is eliminated), the DSP 4 proceeds to step S115. At step S115, the DSP 4 sets the number of pieces of data to be demodulated to N pieces. For example, the DSP 4 instructs the demodulation processor 46 to perform the demodulation process on the N-pieces of data. When the number of pieces of data to be demodulated is set, at step S116, the DSP 4 prepares N pieces of the quadrature detection data. For example, the DSP 4 specifies the address of the buffer 43 for reading out the N pieces of the data. At step S114, the DSP 4 performs the demodulation process on the set pieces of the data by the demodulation processor 46. Then, the DSP 4 returns to step S102.

At step S103, when the reception of the N pieces of quadrature detection data has not yet completed (No at step S103), the DSP 4 returns to step S102, and waits until the N pieces of quadrature detection is received.

As described above, the receiving method implemented by the receiving circuit 10 is a receiving method that includes a process of detecting arrival of a reception signal (such as step S106 described above); a process of storing data corresponding to the reception signal described above when the arrival of the reception signal described above has not detected (such as step S108 described above); and a process of demodulating the stored data sequentially in ascending order of the stored time when the arrival of the reception signal described above has detected (such as step S114 described above). By implementing the receiving method, it is possible to perform the reception without the omission of the head part of the reception signal.

State Transition of the Receiving Circuit

Figure 8:
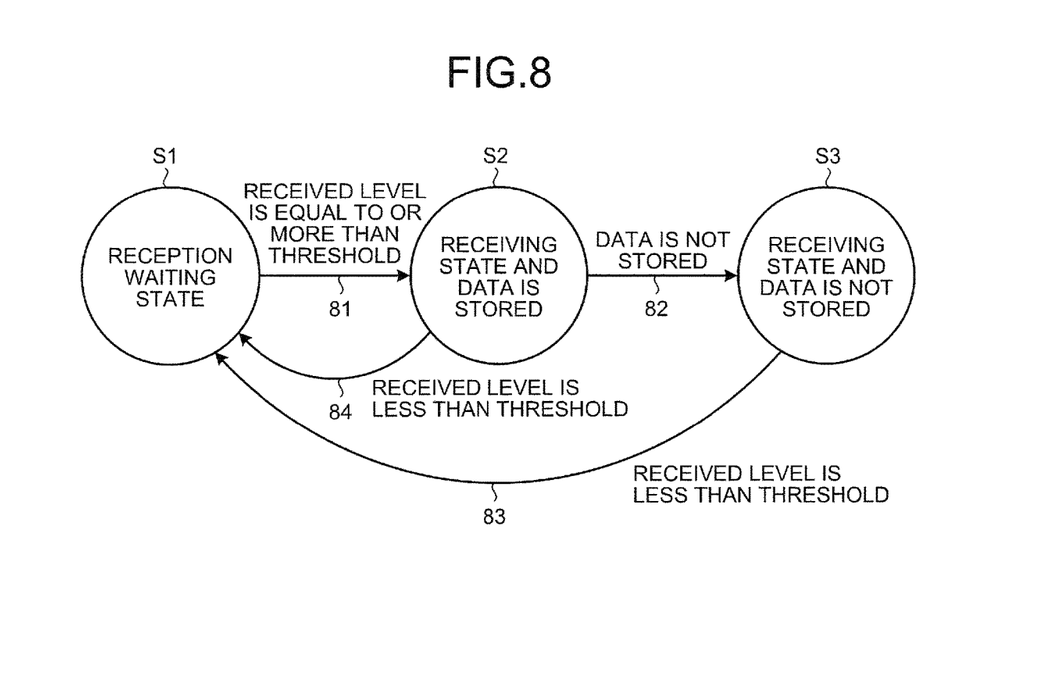
FIG. 8 is a state transition diagram illustrating an operation example of the receiving circuit.

FIG. 8 is a state transition diagram illustrating an operation example of the receiving circuit described above.

A state S1 is a reception waiting state, while received level of a reception signal is less than a predetermined threshold. The state S1 is explained by referring to FIG. 4. A state S2 indicates a receiving state and a state where data is stored in a buffer, while the received level of the reception signal is equal to or more than the predetermined threshold. The state S2 is explained by referring to FIG. 5. The state S2 is a state when the data delay is being eliminated, by setting the number of pieces of data to be demodulated by the demodulation processor 46, for example, twice. A state S3 indicates a receiving state and a state where data is not stored in the buffer, while the received level of the reception signal is equal to or more than the predetermined threshold. The state S3 is explained by referring to FIG. 6. The state S3 is a state when the data delay is eliminated, by setting the number of pieces of data to be demodulated by the demodulation processor 46, for example, twice.

A transition 81 is a transition when the received level of the reception signal is equal to or more than the predetermined threshold during the reception waiting state. The switcher 45 is switched ON by the transition 81.

A transition 82 is a transition when data is not stored in the buffer during the receiving state. The switcher 44 is switched by the transition 82 so that data corresponding to the reception signal is supplied to the demodulation processor 46 without passing through the buffer 43.

A transition 83 is a transition when data is not stored in the buffer and the received level of the reception signal is less than the predetermined threshold, during the receiving state. The switcher 44 is switched by the transition 83 so that data corresponding to the reception signal is supplied to the buffer 43. The switcher 45 is switched OFF.

A transition 84 is a transition when data is stored in the buffer and the received level of the reception signal is less than the predetermined threshold, during the receiving state. The switcher 44 is switched by the transition 84 so that data corresponding to the reception signal is supplied to the buffer 43. The switcher 45 is switched OFF.

When the received level of the reception signal is equal to or more than the predetermined threshold, and when data is not stored in the buffer 43 during the reception waiting state, the state S1 makes transition to the state S3. Due to the transition from the state S1 to the state S3, the switcher 44 is switched so that data corresponding to the reception signal is supplied to the demodulation processor 46 without supplying the data to the buffer 43.

Example of the Structure of the Buffer

Figure 9:
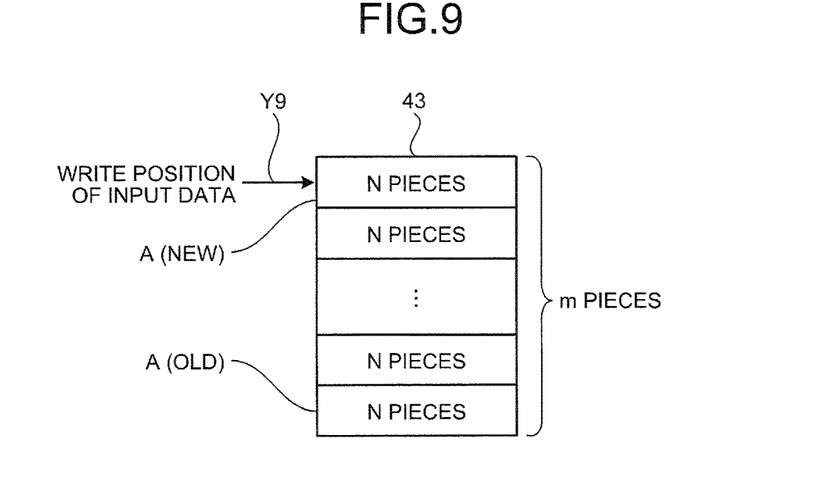
FIG. 9 is a diagram illustrating an example of a structure of the buffer in the receiving circuit.

FIG. 9 is a diagram illustrating an example of a structure of the buffer 43 in the receiving circuit 10. FIG. 9 conceptually illustrates the storage area in the buffer 43.

The buffer 43 includes a storage area composed of a plurality of blocks. The buffer 43 stores therein N pieces of data acquired by a single receiving process as a single block. The storage area in the buffer 43 has a size capable of storing m pieces (m is a positive integer) of the single block that includes the N-pieces of data. In the following explanation, each block is referred to as a "block A (x)" (x=0, 1, . . . , y, . . . ).

For example, the buffer 43 is a first-in-first-out (FIFO)-type buffer. The FIFO buffer performs an operation of sequentially shifting the written data on a block-by-block basis, and first reading out the data that has been written previously (in other words, the oldest data) on a block-by-block basis.

In the buffer 43 of the present example, the data is shifted from the upper side toward the lower side in FIG. 9 on a block-by-block basis. The position of an arrow Y9 in FIG. 9 is a write position of the input data. Thus, the data that is stored in the top block A (new) of the buffer 43 in FIG. 9 is the newest data, and the data that is stored in the lowest block A (old) is the oldest data.

A value m as the number of blocks in the buffer 43 is a value for determining a delay amount of data, and affects generation of the omission of the head part of the reception signal. In other words, if the value m is too small, data may be already discarded by the shift operation at the time when the received level of the reception signal is detected to be equal to or more than the threshold. Consequently, the data cannot be demodulated and the omission of the head part of the reception signal may occur. Thus, the value m needs to be set so that the omission of the head part of the reception signal does not occur.

Operation Example of the Buffer

FIG. 10 to FIG. 15 are diagrams each illustrating an operation example of the buffer 43 in the receiving circuit 10.

In an initial state of the receiving circuit 10, the blocks in the buffer 43 are in an empty state. When the number of pieces of data stored in the buffer 43 is "0", the controller 47 controls the buffer 43 so that all the blocks in the buffer 43 are empty.

A process of changing the number of pieces of data in the buffer 43 includes a storage process of data (steps S108 and S111 in FIG. 7) and a preparation process of data to be demodulated (step S113 in FIG. 7).

Figure 10:
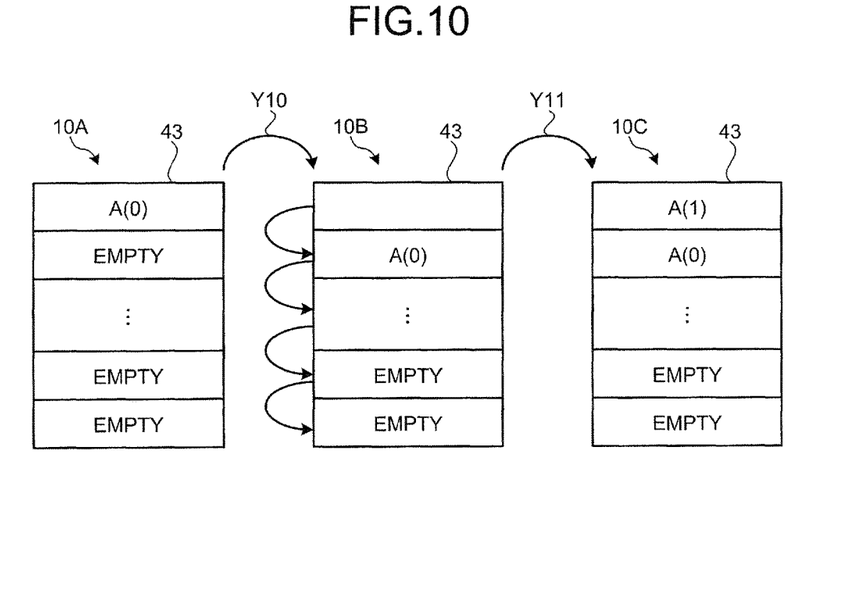
FIG. 10 is a diagram illustrating an operation example of the buffer in the receiving circuit.
Figure 11:
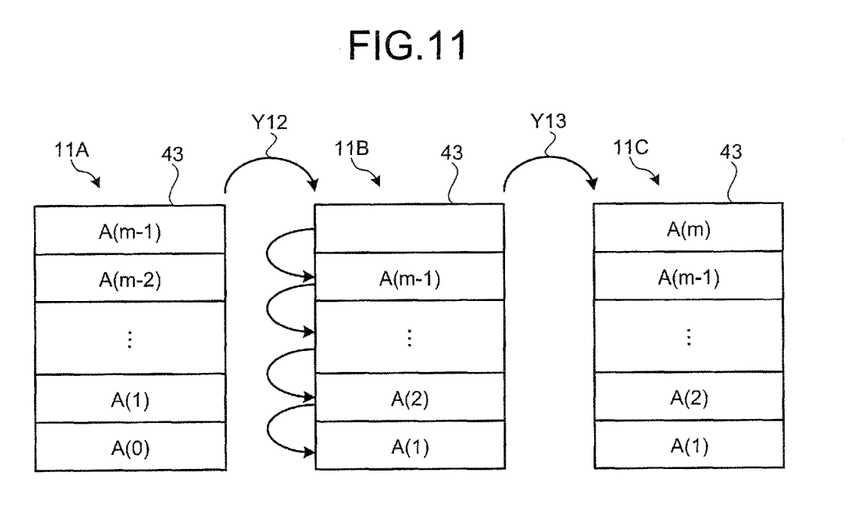
FIG. 11 is a diagram illustrating an operation example of the buffer in the receiving circuit.

With reference to FIG. 10 and FIG. 11, the storage process of storing data into the buffer 43 will be described first.

When the received level of the reception signal is less than the predetermined threshold and in the reception waiting state, in the storage preparation process at step S107 or step S110 in FIG. 7, the controller 47 shifts the blocks of the data stored in the buffer 43 by a single block (N pieces of data) toward a direction of the block of the old data. After the shift, the oldest data in the buffer 43 before the shift is discarded by being overwritten with the shifted block of the data. Then, in the storage process of the input data at step S108 and S111 in FIG. 7, input data is stored in a block for storing the newest data that has become empty due to the shift. At this time, the number of pieces of data being stored is updated. The controller 47 then stores the number of pieces of data that is stored in the buffer 43 in an area 471.

FIG. 10 is a diagram illustrating a state when a single block of data is stored in the buffer 43 in a state when a single block of data has been stored in the storage area in the buffer 43 during the reception waiting state. In FIG. 10, at a state 10A, the buffer 43 stores therein the N pieces of data as a block A (0). Then, the buffer 43 makes a transition to a state 10B as indicated by an arrow Y10, and the controller 47 shifts the data in the buffer 43 toward the direction of the old data by a single block (N pieces of data). The buffer 43 then makes a transition to a state 10C as indicated by an arrow Y11, and stores the new N pieces of data in an area that has become empty by the shift as a block A (1). At the state 100, the number of pieces of data stored in the buffer 43 is "2". The controller 47 then stores the number of pieces of data stored in the buffer 43 in the area 471.

During the reception waiting state, the above operation is repeatedly performed. The data of the oldest block A (old) in the buffer 43 is sequentially discarded as the data is shifted.

FIG. 11 is a diagram illustrating a state when a single block of data is stored in the buffer 43 in a state when data is stored in all the storage areas in the buffer 43 during the reception waiting state. In FIG. 11, at a state 11A, m blocks each of which including the N pieces of data are stored in the buffer 43 from the block A (0) to a block A (m−1). Then, the buffer 43 makes a transition to a state 11B as indicated by an arrow Y12, and the controller 47 shifts the data in the buffer 43 toward the direction of the old data by a single block (N pieces of data). Due to the shift, the data that is stored as the block A (0) will be discarded. The buffer 43 then makes a transition to a state 11C as indicated by an arrow Y13, and stores a single piece of data in an area that has become empty due to the shift as a block A (m). At the state 11C, the number of pieces of data stored in the buffer 43 is "m". The controller 47 stores the number of pieces of data "m" stored in the buffer 43 in the area 471.

Next, with reference to FIG. 12 to FIG. 15, a process of preparing data to be demodulated will be described. In the present example, to empty the buffer 43, the controller 47 prepares two blocks of data from the oldest data among the data stored in the buffer 43. At this time, the controller 47 reads out the two blocks of data from the buffer 43.

Figure 12:
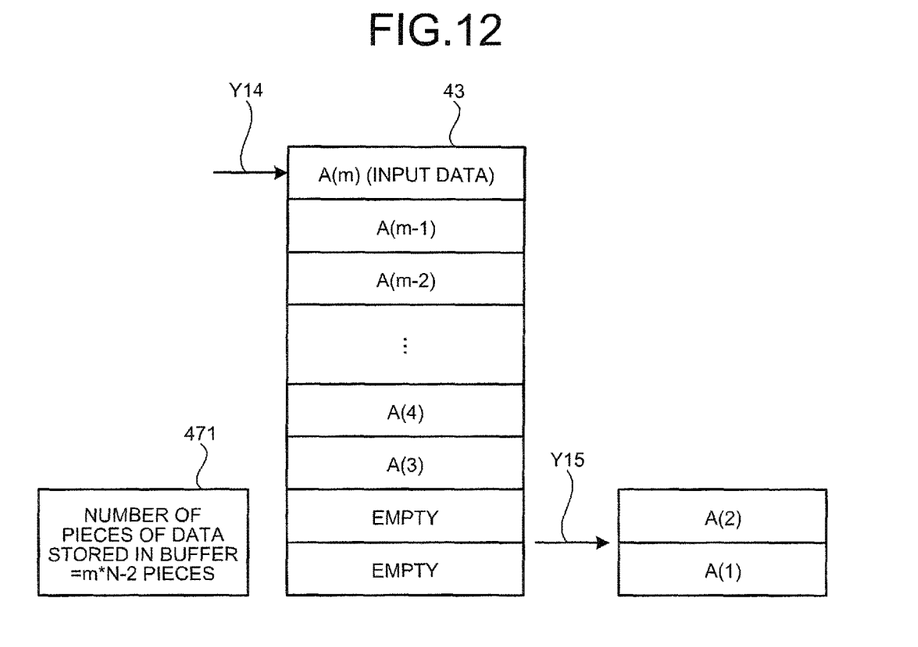
FIG. 12 is a diagram illustrating an operation example of the buffer in the receiving circuit.

FIG. 12 is a diagram illustrating a process of reading out the data from the buffer 43 just after the received level of the reception signal becomes equal to or more than the predetermined threshold. The controller 47 writes the N pieces of data, in other words, a single block A (m) in the buffer 43 as indicated by an arrow Y14. The controller 47 then reads out 2*N pieces of data, in other words, data stored as two blocks of A (1) and A (2) as indicated by an arrow Y15 from the buffer 43. At this time, the controller 47 reads out the oldest 2*N pieces of data among the data stored in the buffer 43 as data to be demodulated. The controller 47 then sets the blocks in the buffer 43 from which the data are read out to empty, and deducts "2" from the number of pieces of data stored in the buffer 43. Consequently, the number of pieces of data stored in the buffer 43 becomes m*N−2 pieces. The controller 47 then stores the number of pieces of data (m*N−2) stored in the buffer 43 in the area 471.

Figure 13:
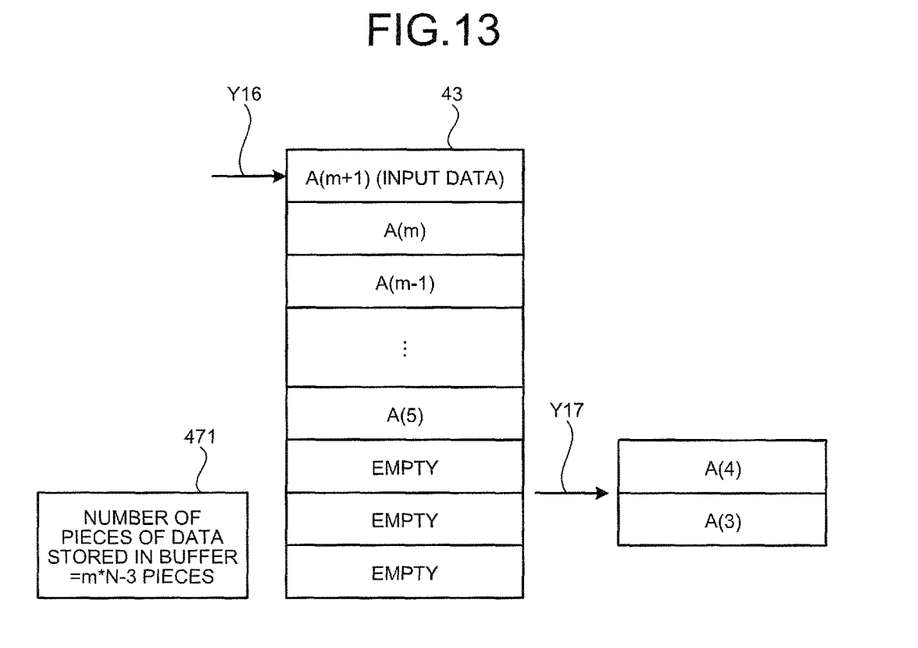
FIG. 13 is a diagram illustrating an operation example of the buffer in the receiving circuit.

FIG. 13 is a diagram illustrating a process subsequent to the process illustrated in FIG. 12. As indicated by an arrow Y16, the controller 47 writes the N pieces of data, in other words, a single block A (m+1) in the buffer 43. In addition, as illustrated in an arrow Y17, the controller 47 reads out 2*N pieces of data, in other words, data stored as two blocks of A(3) and A(4) from the buffer 43. At this time, the controller 47 reads out the oldest 2*N pieces of data among the data stored in the buffer 43 as data to be demodulated. Thus, a single block of data is written in the buffer 43 and two blocks of data are read out from the buffer 43. Consequently, the controller 47 sets the blocks of the buffer 43 from which the data is read out to empty, and deducts "1" from the number of pieces of data stored in the buffer 43. Hence, the number of pieces of data stored in the buffer 43 becomes m*N−3 pieces. The controller then stores the number of pieces of data (m*N−3) stored in the buffer 43 in the area 471.

The controller 47 repeats the similar processes. To empty the storage area in the buffer 43, the controller 47 increases the number of blocks to be read out from the buffer 43, as compared with the number of blocks that is written in the buffer 43. Thus, the number of pieces of data stored in the buffer 43 is gradually decreased. Consequently, it is possible to eliminate the delay between the reception data and the demodulated data that is generated as a side effect of the buffering.

Figure 14:
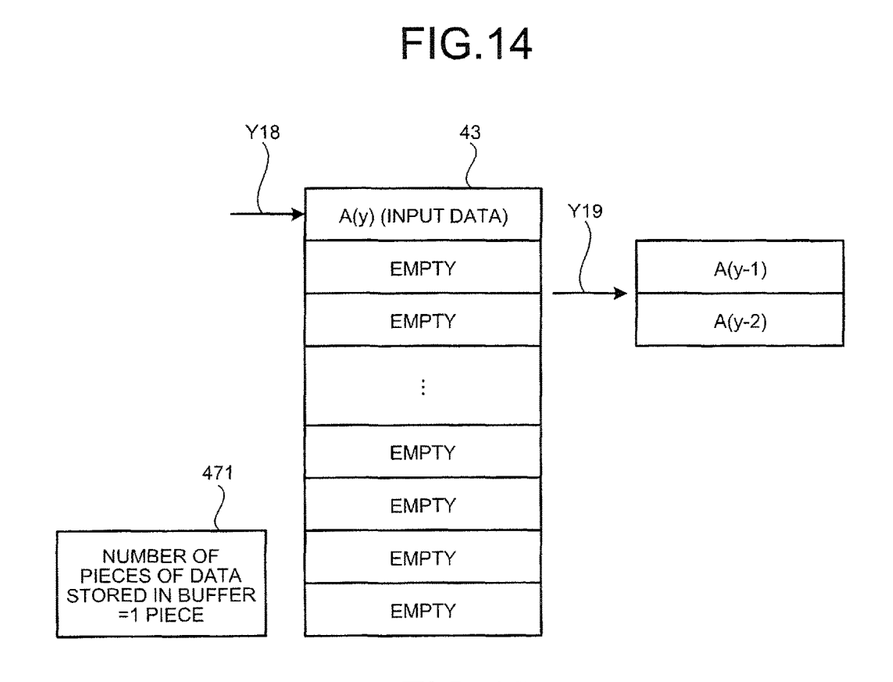
FIG. 14 is a diagram illustrating an operation example of the buffer in the receiving circuit.

FIG. 14 is a diagram illustrating a process when the number of pieces of data stored in the buffer 43 becomes "1". As indicated by an arrow Y18, the controller 47 writes N pieces of data, in other words, a single block A (y) in the buffer 43. In addition, as indicated by an arrow Y19, the controller 47 reads out 2*N pieces of data, in other words, data stored as two blocks A(y−2) and A(y−1) from the buffer 43. Thus, a single block of data is written in the buffer 43 and two blocks of data are read out from the buffer 43. Consequently, the controller 47 sets the block in the buffer 43 from which the data is read out to empty, and deducts "1" from the number of pieces of data stored in the buffer 43. Hence, the number of pieces of data stored in the buffer 43 becomes "1". The controller 47 then stores the number of piece of data "1" stored in the buffer 43 in the area 471.

Figure 15:
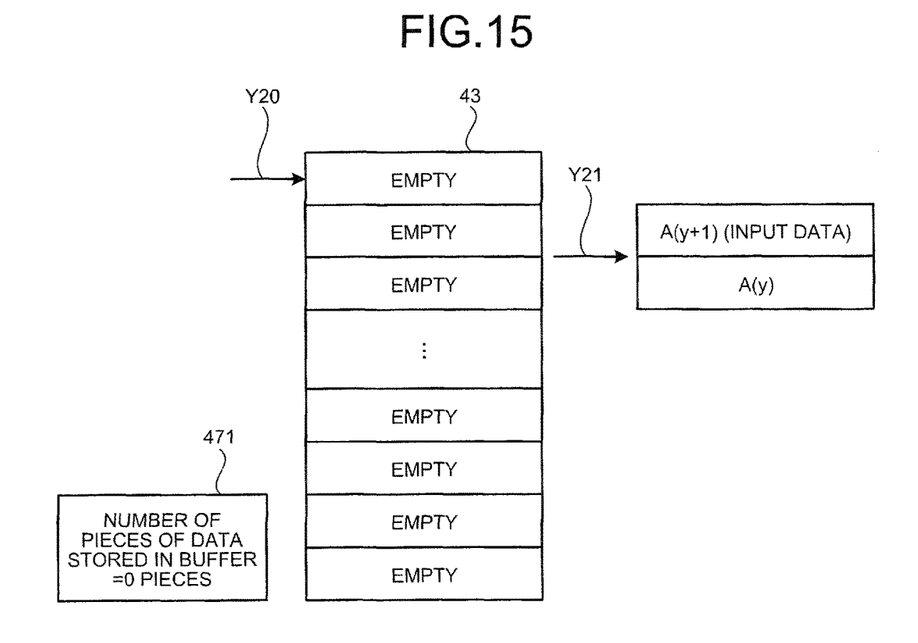
FIG. 15 is a diagram illustrating an operation example of the buffer in the receiving circuit.

FIG. 15 is a diagram illustrating when the number of pieces of data stored in the buffer 43 is changed to "0", by reading out the data from the buffer 43. As indicated by an arrow Y20, the controller 47 writes the N pieces of data, in other words, a single block A (y+1) in the buffer 43. In addition, as indicated by an arrow Y21, the controller 47 reads out the 2*N pieces of data, in other words, data stored as two blocks A(y) and A(y+1) from the buffer 43. Thus, a single block of data is written in the buffer 43, and two blocks of data are read out from the buffer 43. Consequently, the controller 47 sets the block of the buffer 43 from which the data is read out to empty, and deducts "1" from the number of pieces of data stored in the buffer 43. Hence, the number of pieces of data stored in the buffer 43 becomes "0", and the buffer 43 does not store therein data anymore. All the storage areas in the buffer 43 become empty. The controller 47 then stores the number of pieces of data "0" stored in the buffer 43 in the area 471.

Modification

In the configuration illustrated in FIG. 3, the buffer 43 is provided inside of the DSP 4. However, it is not limited thereto, and the buffer 43 may be provided outside of the DSP 4.

In the above, the power is supplied to the units in the receiving device 100 from the battery 9. However, it is not limited thereto, and the power may be supplied to the units in the receiving device 100 from a commercial power supply.

In the above, the digital modulation system is the 4PSK. However, it is not limited thereto. For example, even when a binary phase shift keying (BPSK), a frequency shift keying (FSK), an amplitude shift keying (ASK), a quadrature amplitude modulation (QAM), or the like is used as the digital modulation system, it is possible to prevent omission of a head part of a reception signal by buffering data when a received level of a reception signal is less than a predetermined threshold, and demodulating the data having been buffered when the received level of the reception signal has changed to equal to or more than the predetermined threshold.

CONCLUSION

As described above, by buffering the reception data in advance, it is possible to start demodulation from the data corresponding to the reception signal just before the received level of the reception signal changes. Consequently, it is possible to prevent omission of a head part of a reception signal during the reception. Because processing load for buffering the reception data is very small, power consumption of the buffer is insignificant. Thus, by performing the buffering, it is possible to maintain power saving operation, extend battery life, extend a reception waiting time as long as possible, and prevent omission of a head part of a reception signal.

A receiving circuit, a receiving device including the same, and a receiving method according to the present disclosure can receive a signal without omission of a head part of a reception signal.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A receiving circuit, comprising:
   a receiver configured to receive a signal;
   a detector configured to detect arrival of a reception signal based on the signal received by the receiver;
   a buffer configured to store therein data corresponding to the reception signal;
   a demodulation processor configured to demodulate data to be supplied;
   a switcher configured to set at least one of a first state and a second state; and
   a controller configured
      to set the switcher to the first state in which the data is stored corresponding to the reception signal in the buffer when the detector does not detect the arrival of the reception signal; and
      to switch the switcher from the first state to the second state in which the data is supplied to the demodulation processor without passing through the buffer when the detector detects the arrival of the reception signal and data is not stored in the buffer in the first state.

2. The receiving circuit according to claim 1, wherein the controller is further configured to set the switcher to the first state when the detector detects the arrival of the reception signal and data is stored in the buffer and to set the number of pieces of data supplied from the buffer to the demodulation processor so as to be greater than the number of pieces of data supplied from the receiver to the buffer.

3. The receiving circuit according to claim 2, wherein the demodulation processor includes
   a power saving mode that saves power consumption;
   a normal demodulation mode that demodulates data to be supplied; and
   a high-speed demodulation mode that demodulates twice or more the number of pieces of data; and
   the controller is further configured
      to set the demodulation processor to the power saving mode when the detector does not detect the arrival of the reception signal while the switcher is in the first state;
      to set the demodulation processor to the high-speed demodulation mode when the detector detects the arrival of the reception signal while the switcher is in the first state; and
      to set the demodulation processor to the normal demodulation mode when the switcher is switched to the second state.

4. The receiving circuit according to claim 1, further comprising a band limiting filter processor configured to perform a band limiting process of the reception signal, wherein
   the buffer is configure to store therein data corresponding to the reception signal after performing a band limiting process thereof by the band limiting filter processor.

5. The receiving circuit according to claim 1, wherein the detector is configured
   to detect the arrival of the reception signal by detecting a received level of the reception signal;
   to determine that the reception signal does not arrive when the received level of the reception signal detected is less than a predetermined value; and
   to determine that the reception signal arrives when the received level of the reception signal detected is equal to or more than the predetermined value.

6. A receiving device, comprising:
   a receiving circuit comprising:
      a receiver configured to receive a signal;
      a detector configured to detect arrival of a reception signal based on the signal received by the receiver;
      a band limiting filter processor configured to perform a band limiting process of the reception signal;
      a buffer configured to store therein data corresponding to the reception signal after performing the band limiting process of the reception signal by the band limiting filter processor;
      a demodulation processor configured to demodulate data to be supplied; and
      a controller configured
         to store the data corresponding to the reception signal in the buffer when the detector does not detect the arrival of the reception signal;
         to supply the data stored in the buffer to the demodulation processor when the detector detects the arrival of the reception signal; and
         to output data that is demodulated by the demodulation processor.

7. A receiving method of a receiving circuit, comprising:
   performing a band limiting process of a reception signal;
   detecting arrival of the reception signal based on a signal received;
   storing data corresponding to the reception signal that the band limiting process is performed, when the arrival of the reception signal is not detected; and
   demodulating the stored data stored in ascending order of a stored time sequentially when the arrival of the reception signal is detected.

* * * * *